(12) United States Patent
Zhou et al.

(10) Patent No.: US 11,747,472 B2
(45) Date of Patent: Sep. 5, 2023

(54) RANGE ESTIMATION FOR LIDAR SYSTEMS

(71) Applicant: BEIJING VOYAGER TECHNOLOGY CO., LTD., Beijing (CN)

(72) Inventors: Qin Zhou, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 464 days.

(21) Appl. No.: 16/994,447

(22) Filed: Aug. 14, 2020

(65) Prior Publication Data

US 2022/0050200 A1 Feb. 17, 2022

(51) Int. Cl.
*G01S 17/18* (2020.01)
*G01S 17/931* (2020.01)
*G01S 7/4861* (2020.01)

(52) U.S. Cl.
CPC ............ *G01S 17/18* (2020.01); *G01S 17/931* (2020.01); *G01S 7/4861* (2013.01)

(58) Field of Classification Search
CPC ....... G01S 17/18; G01S 17/931; G01S 7/4861
See application file for complete search history.

(56) References Cited

U.S. PATENT DOCUMENTS

| | | | | |
|---|---|---|---|---|
| 10,817,588 B2 * | 10/2020 | Warburton | .............. | G01S 17/10 |
| 2018/0113203 A1 * | 4/2018 | Warburton | .............. | G01R 29/02 |
| 2018/0284277 A1 * | 10/2018 | LaChapelle | ............. | G01S 17/89 |
| 2018/0373253 A1 * | 12/2018 | Lipson | .................. | G01S 7/4815 |
| 2019/0353787 A1 * | 11/2019 | Petit | ........................ | G01S 7/484 |
| 2020/0049821 A1 * | 2/2020 | LaChapelle | ............. | G01S 17/42 |
| 2020/0158834 A1 * | 5/2020 | Han | ....................... | G01S 17/931 |
| 2020/0166643 A1 * | 5/2020 | Stutz | ...................... | G01S 7/4865 |

FOREIGN PATENT DOCUMENTS

EP       3529628 B1 *  3/2022  ............. G01S 11/02

* cited by examiner

*Primary Examiner* — Isam A Alsomiri
*Assistant Examiner* — Joseph C Fritchman
(74) *Attorney, Agent, or Firm* — BAYES PLLC

(57) ABSTRACT

Embodiments of the disclosure provide an optical sensing system, a range estimation system for the optical sensing system, and a method for the optical sensing system. The exemplary optical sensing system includes a transmitter configured to emit a plurality of laser pulses towards an object. The optical sensing system further includes a range estimation system configured to estimate a range between the object and the optical sensing system. The range estimation system includes an analog to digital converter (ADC) configured to convert a plurality of laser pulses returned from an object to a digital signal. The ADC has a predetermined sampling period. The exemplary system further includes a processor. The processor is configured to calculate an intensity ratio between two data points selected from the digital signal. The processor is further configured to determine an arrival time of the first returned laser pulse based on the intensity ratio and a time difference between respective sample times of the two data points. The processor is also configured to estimate a range between the object and the optical sensing system based on the arrival time of the first returned laser pulse.

20 Claims, 7 Drawing Sheets

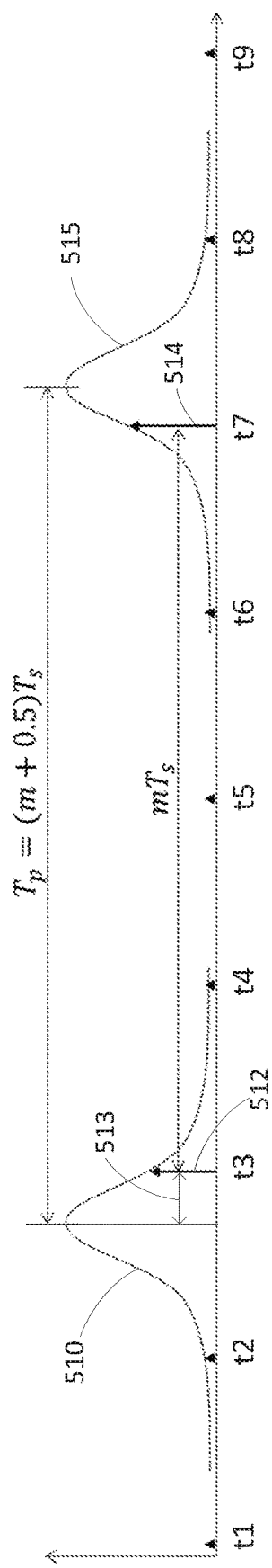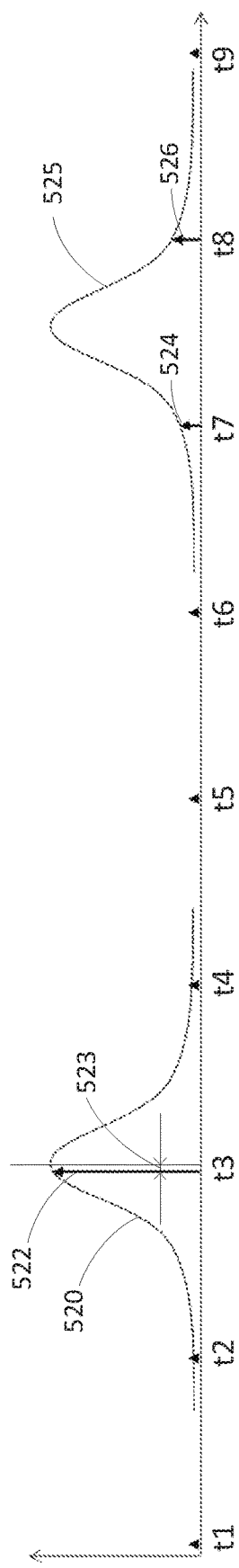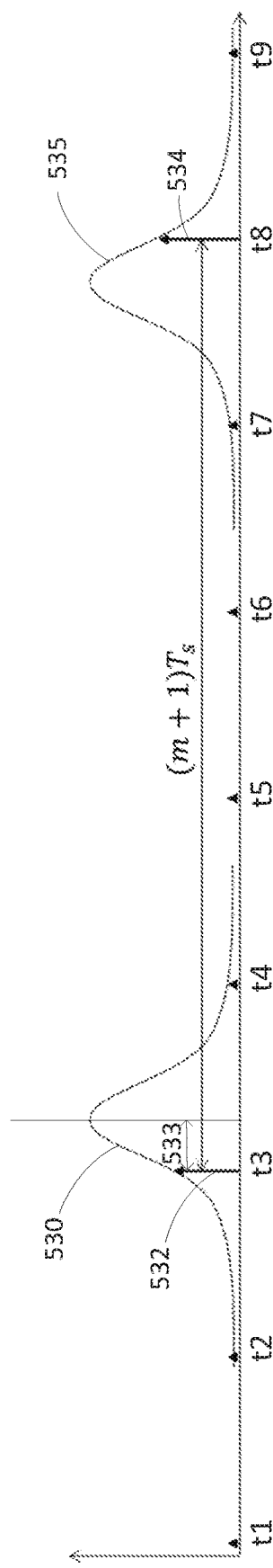

| Intensity Ratio | Time Adjustment Amount (ns) |
|---|---|
| ... | ... |
| 1.0 | $-0.25T_s$ |
| 5.0 | $+0.05T_s$ |
| ... | ... |

FIG. 6A

| Intensity Ratio | Time Adjustment Amount (ns) |
|---|---|
| ... | ... |
| 1.0 | $+0.25T_s$ |
| ... | ... |

FIG. 6B

RANGE ESTIMATION FOR LIDAR SYSTEMS

TECHNICAL FIELD

The present disclosure relates to range estimation for a light detection and ranging (LiDAR) system, and more particularly to, range estimation using a plurality of specifically timed laser pulses for the LiDAR system.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system typically includes a transmitter to emit a laser pulse to an object. The laser pulse is backscattered and returned by the object, and the returned laser pulse is received by a LiDAR receiver. The LiDAR receiver typically includes a detector to convert the returned laser pulse into an electrical signal. The analog electrical signal is then converted into a digital signal by an ADC. The distance to the object (also referred to as the "range") can be estimated based on a time difference between an emitting time of the laser pulse and an arrival time of the returned laser pulse determined using the digital signal.

Range estimation relies on accurate determination of the arrival time of the returned laser pulse. Arrival time typically refers to the time when a peak of the laser pulse arrives at the receiver. If an ADC with a low sampling rate is used to sample the returned pulse, the waveform of the pulse cannot be sufficiently reconstructed from the digital signal and the arrival time of its peak cannot be accurately determined, thus impairing the range estimation accuracy. Some existing range estimation methods use a high-speed ADC to sample the returned laser pulse at a high frequency to improve the waveform reconstruction. However, the high-speed ADC is much more expensive than the ADC with a low sampling rate. Further, the high-speed ADC may cause substantial noises during operation of the optical sensing system.

Embodiments of the disclosure improve range estimation accuracy of optical sensing systems such as LiDAR systems by using a plurality of specifically timed laser pulses for accurately determining an arrival time of a first returned laser pulse at a lower ADC sampling rate.

SUMMARY

Embodiments of the disclosure provide a range estimation system for an optical sensing system. The exemplary system includes an analog to digital converter (ADC) configured to convert a plurality of laser pulses returned from an object to a digital signal. The ADC has a predetermined sampling period. The exemplary system further includes a processor. The processor is configured to calculate an intensity ratio between two data points selected from the digital signal. The processor is further configured to determine an arrival time of the first returned laser pulse based on the intensity ratio and a time difference between respective sample times of the two data points. The processor is also configured to estimate a range between the object and the optical sensing system based on the arrival time of the first returned laser pulse.

Embodiments of the disclosure also provide a range estimation method for an optical sensing system. The exemplary method includes converting, by an analog to digital converter (ADC) having a predetermined sampling period, a plurality of laser pulses returned from an object to a digital signal. The exemplary method further includes calculating an intensity ratio, by a processor, between two data points selected from the digital signal. The exemplary method also includes determining, by the processor, an arrival time of the first returned laser pulse, by the processor, based on the intensity ratio and a time difference between respective sample times of the two data points. The exemplary method additionally includes estimating, by the processing, a range between the object and the optical sensing system, by the processor, based on the arrival time of the first returned laser pulse.

Embodiments of the disclosure further provide an optical sensing system, a range estimation system for the optical sensing system, and a method for the optical sensing system. The exemplary optical sensing system includes a transmitter configured to emit a plurality of laser pulses towards an object. The optical sensing system further includes a range estimation system configured to estimate a range between the object and the optical sensing system. The range estimation system includes an analog to digital converter (ADC) configured to convert a plurality of laser pulses returned from an object to a digital signal. The ADC has a predetermined sampling period. The exemplary system further includes a processor. The processor is configured to calculate an intensity ratio between two data points selected from the digital signal. The processor is further configured to determine an arrival time of the first returned laser pulse based on the intensity ratio and a time difference between respective sample times of the two data points. The processor is also configured to estimate a range between the object and the optical sensing system based on the arrival time of the first returned laser pulse.

It is to be understood that both the foregoing general description and the following detailed description are exemplary and explanatory only and are not restrictive of the invention, as claimed.

BRIEF DESCRIPTION OF THE DRAWINGS

FIG. 5A illustrates two exemplary non-zero data points sampled from two sequentially returned laser pulses, according to embodiments of the disclosure.

FIG. 5B illustrates three exemplary non-zero data points sampled from two sequentially returned laser pulses, according to embodiments of the disclosure.

FIG. 5C illustrates two exemplary non-zero data points sampled from other two sequentially returned laser pulses, according to embodiments of the disclosure.

FIGS. 6A-6B each illustrates an exemplary look-up table for determining a time adjustment amount to the sample time of the first non-zero data point, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for automatically estimating a range between an object and an optical sensing system (e.g., a LiDAR system). For example, the optical sensing system may include a transmitter configured to emit a plurality of pulsed light beams (e.g., laser pulses) towards the object. In some embodiments, the multiple laser pulses have identical waveforms. For example, the laser pulses have the same pulse width and height. The optical sensing system may include a receiver to receive the laser pulses returned by the object. In some embodiments, the receiver may include an ADC to generate a digital signal by sampling data points from two or more returned laser pulses. For example, 5 data points may be sampled from returned laser pulses arriving at the receiver within a time window of 10 ns when the ADC samples the pulses every 2 ns.

In some embodiments, the optical sensing system may also include a processer configured to calculate a ratio between two non-zero data points sampled from different returned laser pulses. In some embodiments, the ratio is used to determine a time adjustment amount to a sample time of a first selected data point using a pre-computed look-up table. The look-up table may map the ratio to the corresponding time adjustment amount. In some embodiments, the determined time adjustment amount is used to adjust the sample time of the first selected data point to determine an arrival time of the first returned laser pulse. The processor then may determine a distance between the object and the optical sensing system based on the arrival time of the first returned laser pulse.

By automatically estimating the range between the object and the optical sensing system using a plurality of timed laser pulses, embodiments of the present disclosure therefore not only improve the performance of the optical sensing system but also reduce the system manufacturing cost. For example, system may use a low-cost ADC (e.g., a low sampling rate ADC) to obtain a high time quantization accuracy. Further, because the low sampling rate ADC generates less sampling data comparing with a high sampling rate ADC, the disclosed range estimation systems and methods can save computational power (e.g., speeding up the LiDAR system processing speed). The improved optical sensing system can be used in many applications. For example, the improved optical sensing system can be used in advanced navigation technologies, such as to aid autonomous driving or to generate high-definition maps, in which the optical sensing system can be equipped on a vehicle.

Figure 1:
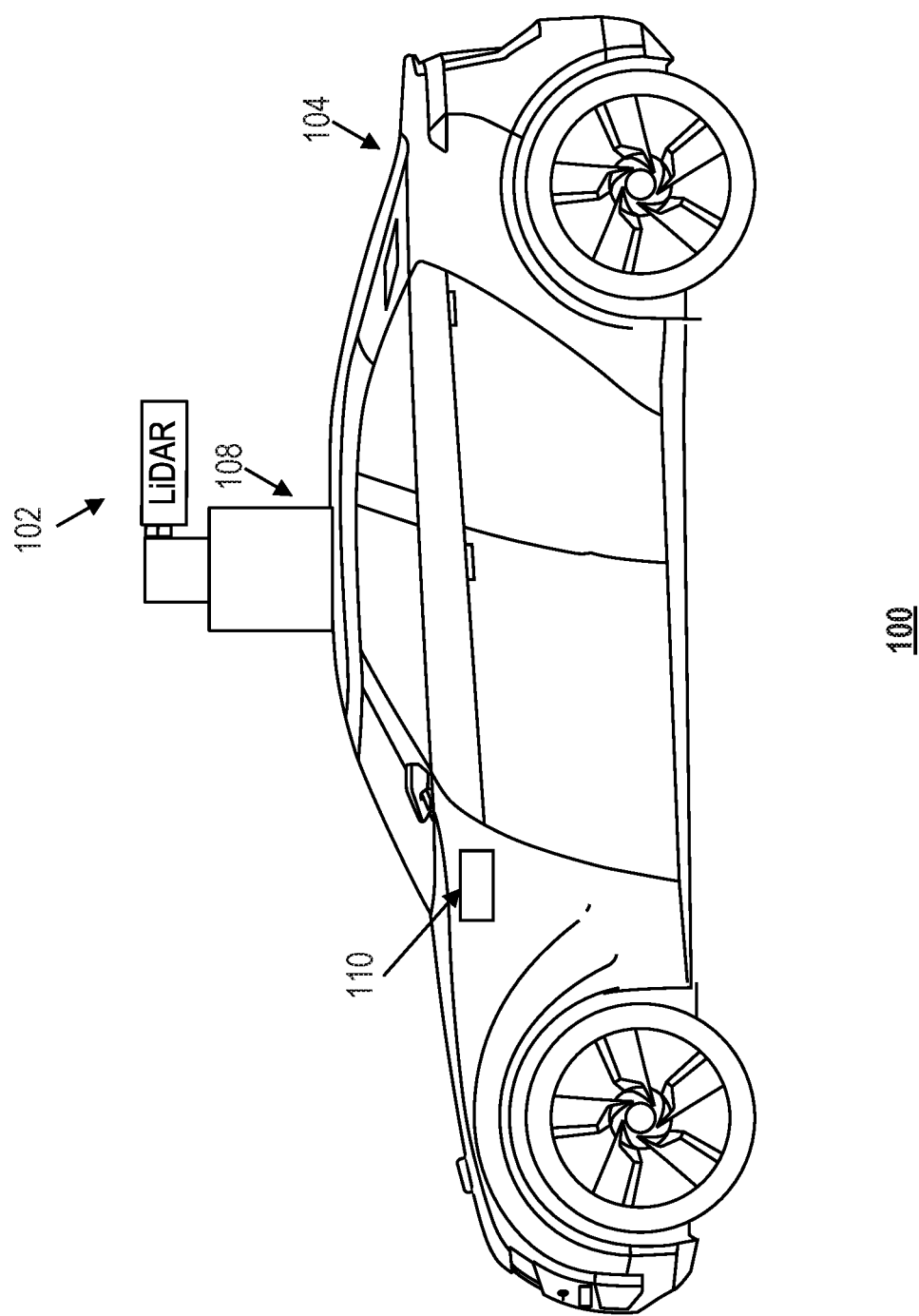
FIG. 1 illustrates a schematic diagram of an exemplary vehicle equipped with a LiDAR system, according to embodiments of the disclosure.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with pulsed laser beams and measuring the reflected/scattered pulses with a receiver. Consistent with the present disclosure, the laser beam may contain two or more pulses. The laser beams used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
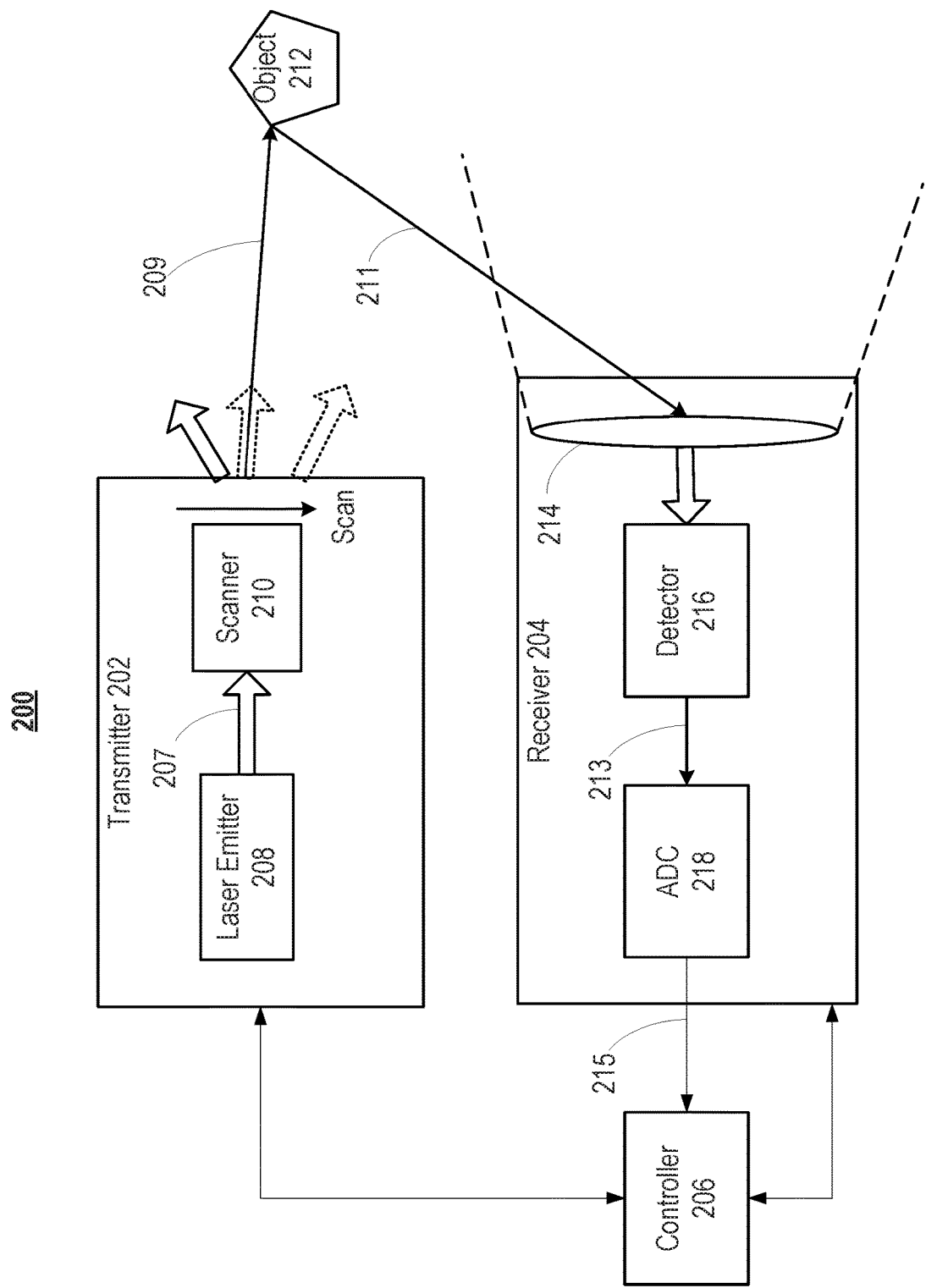
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical beams (e.g., pulsed laser beams) along multiple directions. Transmitter 202 may include one or more laser sources (e.g., a laser emitter 208) and a scanner 210. Transmitter 202 can sequentially emit a stream of pulsed laser beams in different directions within a scan FOV (e.g., a range in angular degrees), as illustrated in FIG. 2.

Laser emitter 208 may be configured to provide laser beams 207 (also referred to as "native laser beams") to scanner 210. In some embodiments of the present disclosure, laser emitter 208 may generate pulsed laser beams in the ultraviolet, visible, or near infrared wavelength range. Consistent with the present disclosure, each laser beam 207 may include a sequence of pulses, that are specifically timed at a predetermined time interval apart (also referred to as "time delay"). The time delay may be measured between the peaks of two consecutive pulses in the sequence. In some embodiments of the present disclosure, laser emitter 208 may include a pulsed laser diode (PLD), a vertical-cavity surfaceemitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beams 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser emitter may be used as laser emitter 208 for emitting laser beams 207.

Scanner 210 may be configured to emit laser beams 209 to an object 212 in a range of detection angles (collectively forming the FOV of transmitter 202). In some embodiments, scanner 210 may also include optical components (e.g., lenses, mirrors) that can collimate pulsed laser light into a narrow laser beam to increase the scan resolution and the range to scan object 212. In some embodiments, object 212 may be made of a wide range of materials including, for example, non-metallic objects, rocks, rain, chemical compounds, aerosols, clouds and even single molecules. The wavelength of laser beams 209 may vary based on the composition of object 212. In some embodiments, at each time point during the scan, scanner 210 may emit laser beams 209 to object 212 in a direction within a range of scanning angles by rotating a deflector, such as a micromachined mirror assembly.

In some embodiments, receiver 204 may be configured to detect returned laser beams 211 returned from object 212. Returned laser beams 211 may be in a different direction from laser beams 209. As the multiple pulses in laser beam 209 reaches the object 212 at different times, they are reflected by object 212 sequentially. Accordingly, laser beams 211 may also include multiple return pulses separated by the predetermined time delay. Receiver 204 can collect laser beams returned from object 212 and output electrical signals reflecting the intensity of the returned laser beams. Upon contact, laser light can be reflected/scattered by object 212 via backscattering, such as Rayleigh scattering, Mie scattering, Raman scattering, and fluorescence. As illustrated in FIG. 2, receiver 204 may include a lens 214, a detector 216, and an ADC 218. Lens 214 may be configured to collect light from a respective direction in the receiver field of view (FOV) and converge the returned laser beams to focus on detector 216. At each time point during the scan, returned laser beams 211 may be collected by lens 214. Returned laser beams 211 may be returned from object 212. The pulses in returned laser beam 211 may have the same waveform (e.g., bandwidth and wavelength) as those in laser beams 209.

Detector 216 may be configured to detect returned laser beams 211 returned from object 212 and converged by lens 214. In some embodiments, detector 216 may convert the laser light (e.g., returned laser beams 211) converged by lens 214 into an electrical signal 213 (e.g., a current or a voltage signal). Electrical signal 213 may be an analog signal which is generated when photons are absorbed in a photodiode included in detector 216. In some embodiments, detector 216 may include a PIN detector, an avalanche photodiode (APD) detector, a single photon avalanche diode (SPAD) detector, a silicon photo multiplier (SiPM) detector, or the like.

ADC 218 may be configured to digitize electrical signal 213 generated by detector 216. For example, ADC 218 may convert electrical signal 213 into a digital signal 215 (e.g., data points representing the intensity of electrical signal 213 at each sampling time point). In some embodiments, data points in digital signal 215 may be sampled from two or more pulses in returned laser beam 211. Digital signal 215 may be transmitted to controller 206 to be processed and analyzed. For example, controller 206 in LiDAR system 102 may include a processor to determine the distance of object 212 from LiDAR system 102 based on digital signal 215 and data of laser beams 209 (e.g., a departure time of a first emitted laser pulse and a time delay between the laser pulses in laser beam 209). In particular, the distance can be determined based on the travel time measured between the departure time of the first laser pulse when it is emitted by transmitter 202 and the arrival time of the first returned laser pulse when it is received by receiver 204. In some alternative embodiments, digital signal 215 may be transmitted to and processed by a separate signal processor at a different location but communicating with controller 206 through a network (not shown). For example, the separate signal processor may be in a cloud or may be alternatively in a single location (such as inside a mobile device) or distributed locations.

Controller 206 may be configured to control transmitter 202 and/or receiver 204 to perform detection/sensing operations. In some embodiments consistent with the present disclosures, controller 206 may be configured to receive digital signal 215 to estimate the range based on the arrival time of the first returned laser pulse in a sequence of pulses and data of laser beams 209. For example, controller 206 may calculate a ratio between two non-zero data points of digital signal 215 that sampled from two different pulses in returned laser beam 211. In some embodiments, controller 206 may be configured to determine a time adjustment amount based on the calculated ratio. For example, a pre-computed look-up table stored in controller 206 may be used to determine the time adjustment amount based on the ratio. In some embodiments, the time adjustment amount may be used to adjust the sample time of the first selected data point and determine the arrival time of the first returned laser pulse. In some embodiments, controller 206 may determine the distance of object 212 from LiDAR system 102 based on the arrival time of the first returned laser pulse of laser beams 211 and the departure time of the first emitted laser pulse of laser beams 209.

In some embodiments, controller 206 may control laser emitter 208 to emit laser beams 207 including the sequence of laser pulses. The time delay between the laser pulses may be determined by controller 206 or preprogrammed in controller 206. In some embodiments, controller 206 may further control scanner 210 to emit laser beams 209 and record the departure time of the first emitted laser pulse in laser beams 209. The departure time of the first laser pulse and the time delay between the laser pulses may be stored in controller 206 for determining a traveling time of the first laser pulse.

Figure 3:
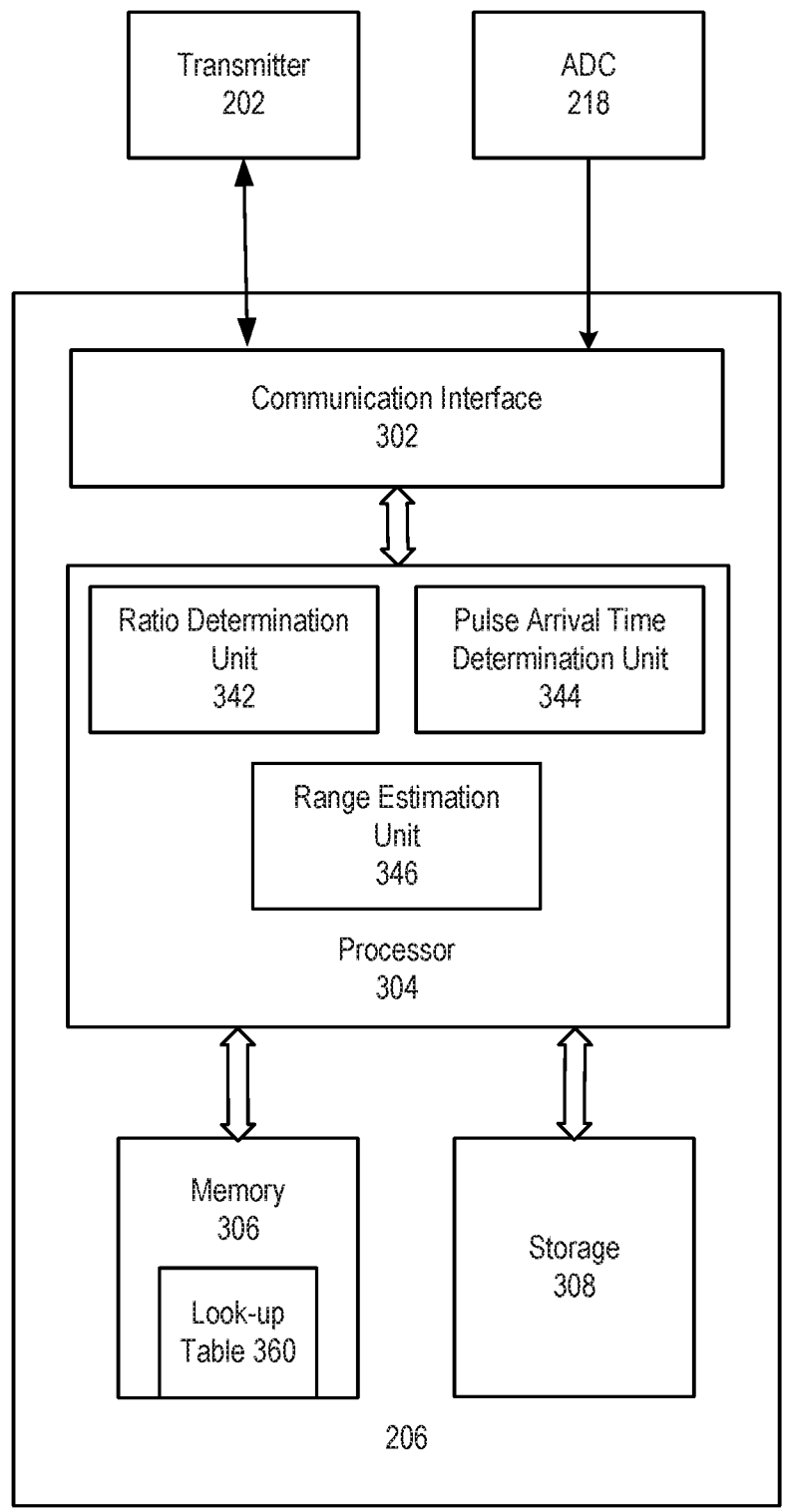
FIG. 3 illustrates a schematic diagram of an exemplary controller for estimating a range for a LiDAR system, according to embodiments of the disclosure.

For example, FIG. 3 illustrates a schematic diagram of an exemplary controller 206 for estimating a range for a LiDAR system, according to embodiments of the disclosure. As shown by FIG. 3, controller 206 may include a communication interface 302, a processor 304, a memory 306, and a storage 308. In some embodiments, controller 206 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of controller 206 may be located in a cloud or may be alternatively in a single location (such as inside a mobile device) or distributed locations. Components of controller 206 may be in an integrated device or distributed at different locations but communicate with each other through a network (not shown). Consistent with the present disclosure, controller 206 may be configured to calculate the ratio between the selected data points, determine the time adjustment amount to the sample time of the first selected data point, determine the arrival time of the first returned laser pulse, and estimate the range between the object and the LiDAR system based on a time difference between the departure time and the arrival time of the first laser pulse. In some embodiments, controller 206 may also perform various other control functions of other components of LiDAR system 102.

Communication interface 302 may send signals to and receive signals from components of transmitter 202 (such as scanner 210) and receiver 204 (such as ADC 218) via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 302 may include an integrated service digital network (ISDN) card, cable modem, satellite modem, or a modem to provide a data communication connection. As another example, communication interface 302 may include a local area network (LAN) card to provide a data communication connection to a compatible LAN. Wireless links can also be implemented by communication interface 302. In such an implementation, communication interface 302 can send and receive electrical, electromagnetic or optical signals in analog form or in digital form.

Consistent with some embodiments, communication interface 302 may receive digital signal 215 reflecting the intensity of the returned laser pulses at each sampling time point from ADC 218. Communication interface 302 may provide control signals to laser emitter 208 for emitting the laser pulses and receive the data of the emitted laser pulses (e.g., the departure time of the first emitted laser pulse and the time delay between the emitted laser pulses). Communication interface 302 may also receive acquired signals from and provide control signals to various other components of LiDAR system 102.

Processor 304 may include any appropriate type of general-purpose or special-purpose microprocessor, digital signal processor, or microcontroller. Processor 304 may be configured as a separate processor module dedicated to LiDAR range estimation, e.g., determining the range between the object and the LiDAR system based on the arrival time of the first returned laser pulse and the data of the emitted laser pulses (e.g., the departure time of the first emitted laser pulse from scanner 210 and the time delay between the emitted laser pulses of laser beams 209). Alternatively, processor 304 may be configured as a shared processor module for performing other functions of LiDAR controls.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform functions disclosed herein. For example, memory 306 and/or storage 308 may be configured to store program(s) that may be executed by processor 304 for LiDAR range estimation. In some embodiments, memory 306 and/or storage 308 may also store intermediate data such as digital signals converted by ADC 218 from the returned laser pulses, intensity ratios calculated based on selected data points from the digital signals, time adjustment amounts determined based on the intensity ratios, arrival times of the first returned laser pulses determined based on the time adjustment amounts, etc. In some embodiments, memory 406 and/or storage 408 may further store information and data used by processor 304. For instance, memory 406 and/or storage 408 may be configured to store pre-computed look-up tables for determining time adjustment amounts. Memory 406 and/or storage 408 may also be configured to store the data of laser beams 209 for determining the traveling time of the first laser pulse. The various types of data may be stored permanently, removed periodically, or disregarded immediately after each scan.

As shown in FIG. 3, processor 304 may include multiple modules, such as a ratio determination unit 342, a pulse arrival time determination unit 344, and a range estimation unit 346, and the like. These modules can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 342-346 all within one processor 304, it is contemplated that these units may be distributed among different processors located closely or remotely with each other.

Figure 4A:
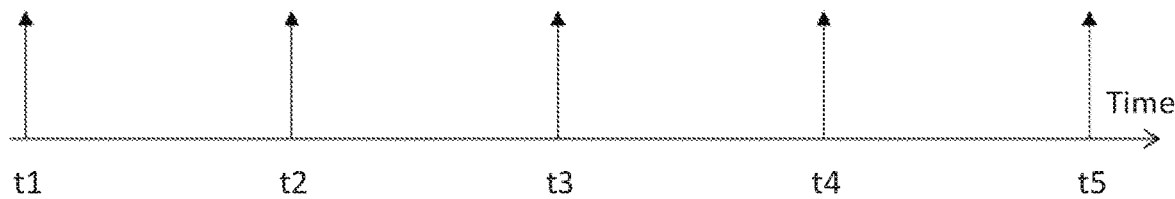
FIG. 4A illustrates an exemplary sampling frequency of an ADC, according to embodiments of the disclosure.

FIG. 4A illustrates an exemplary sampling frequency of an ADC, according to embodiments of the disclosure. An ADC (e.g., ADC 218) may sample a received signal (e.g., electrical signal 213) at a predetermined sampling frequency. The sampling frequency of the ADC may be predetermined. For example, the ADC may sample a data point at each of time points t1, t2, t3, t4, and t5 which evenly distributed in the time domain. In some embodiments, the exemplary sampling frequency (e.g., a sampling period $T_s$) may be determined by controller 206. In some embodiments, the ADC has a constant sampling rate. For example, as shown in FIG. 4A, the sampling period $T_s$ is constant, e.g., $T_s = t2-t1 = t3-t2 = t4-t3 = t5-t4$. In some embodiments, controller 206 may control the sampling period $T_s$ to change following a pattern. As a result, a time difference between the sample times of two data points is a summation of the sampling periods of the ADC between the two data points.

Figure 4B:
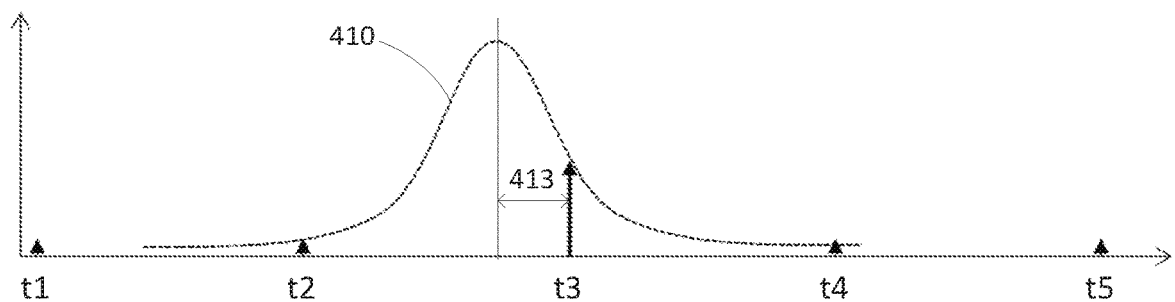
FIGS. 4B-4D each illustrates an exemplary returned laser pulse and sampling data points of the respective laser pulse generated by the ADC, according to embodiments of the disclosure.
Figure 4C:
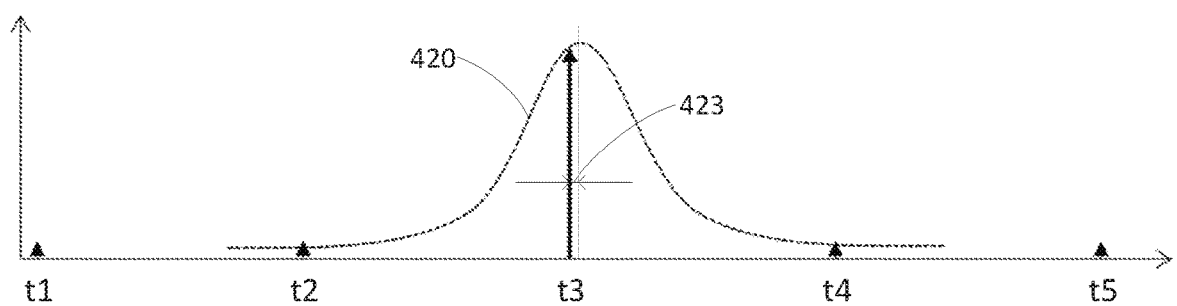
Figure 4D:
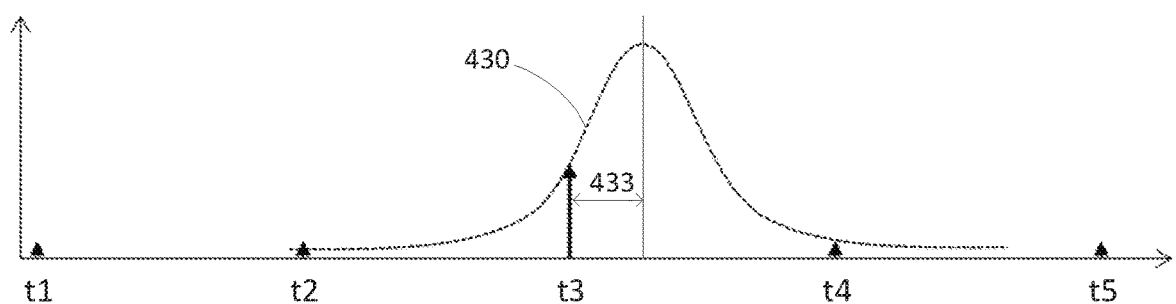

FIGS. 4B-4D each illustrates an exemplary returned laser pulses and sampling data points of the respective laser pulse generated by the ADC, according to embodiments of the disclosure. The returned laser pulses (e.g., pulses 410, 420, and 430) shown in dashed lines in FIGS. 4B-4D may be laser pulses in returned laser beam 211. Pulses 410, 420, and 430 arrive at the ADC at different times. For example, pulse 410 reaches its peak intensity value before sample time point t3, pulse 420 reaches its peak intensity value almost at sample time point t3 and pulse 430 reaches its peak intensity value after sample time point t3. However, when the ADC has a low sampling rate (i.e., the sampling period $T_s$ is relatively short compared to the bandwidth of pulse 410), the analog-to-digital conversion of the returned laser pulses may suffer from a time quantization error. For example, the arrival time of the peak of each pulse may be determined as the sampling time point corresponding to the data point having the highest intensity value. For example, as shown in FIG. 4B, three non-zero data points are sampled from pulse 410 at time points t2, t3, and t4. Among the three points, the data point sampled at t3 (shown in a solid arrow) has the highest intensity value. Accordingly, t3 will be designated as the arrival time of pulse 410. Similarly, in each of pulses 420 and 430 as shown in FIGS. 4C-4D, the non-zero data point having the highest intensity value also occurs at t3. Therefore, the arrival time of each of pulses 420 and 430 will also be t3. As a result, when sampled by a low sampling rate ADC, the arrival times of pulses 410, 420, and 430 will all be t3 despite the pulses actually arrive at different times (corresponding to their respective peak times). The difference between the actual peak time and the time corresponding to the "peak" data point is known as a time quantization error. As shown in FIGS. 4B-4D, the time quantization errors of pulses 410, 420, and 430 are time amounts 413, 423, and 433, respectively. Due to the time quantization error, the LiDAR system could not accurately estimate the range by sampling a single returned pulse using a low sampling rate ADC.

To reduce the time quantization error introduced during the analog-to-digital conversion, the disclosed range estimation systems and methods utilize a plurality of specifically timed laser pulses to increase an accuracy of the arrival time determination of the returned laser pulses. By using laser pulses sequentially emitted at a predetermined time delay, more data samples of the same waveform may be obtained by the ADC, thus compensating for the scarcity of data points sampled by the low sampling rate ADC. For example, FIG. 5A illustrates two exemplary non-zero data points sampled from two sequentially returned laser pulses, according to embodiments of the disclosure. Pulses 510 and 515 (shown in dashed lines) are two sequentially returned laser pulses with a predetermined time delay apart. In some embodiments, the time delay may be non-integer times of the ADC sampling period. For example, as shown in FIG. 4A, the time delay, measured between the peaks of pulses 510 and 515, is $T_p=(m+0.5) \cdot T_s$. Pulse 510 and 512 may have an identical waveform. Pulse 510 may be a first returned laser pulse and pulse 515 may be a second returned laser pulse in laser beam 211. In some embodiments, ADC 218 may sample pulses 510 and 515 at its predetermined sampling frequency. For example, ADC 218 samples a data point at each sample time t1, t2, t3, . . . , t9, etc., as shown in FIG. 5A. Some of the data points may be non-zero (e.g., data points at t3 and t7), while other data points may be substantially zero (e.g., data points at t2, t4, t5, t6, t8, and t9). Consistent with the present disclosure, a zero data point indicates the pulse has a nominal signal intensity at the sample time. A signal intensity is considered nominal when, e.g., it is lower than the noise level. Accordingly, a non-zero data point corresponds to a signal intensity that is above nominal at the sample time, e.g., above the noise level. The data points may be sent to processor 304 in controller 206 for further processing and analysis.

Returning to FIG. 3, ratio determination unit 342 in processor 304 may be configured to process the data points generated by ADC 218. An intensity ratio between a first selected non-zero data point and a second selected non-zero data point may be calculated. For example, as shown in FIG. 5A, data points 512 and 514 are the two selected non-zero data points which are proportional to signal intensities of electrical signal 213 (e.g., intensity value of the returned laser pulses) at time points t3 and t7, respectively. In some embodiments, a time delay $T_p$ between pulses 510 and 515 is a non-integer times of sampling period $T_s$, e.g., $(m+0.5) \cdot T_s$, where m is an integer. In some embodiments, time delay $T_p$ can be controlled by controller 206. Consistent with some embodiments, if the sampling period $T_s$ is constant, the time difference between the two non-zero data points is an integer times of sampling period $T_s$. For example, the time difference between the sample times of data points 512 and 514 is $m \cdot T_s$.

In some embodiments, depending on the timing that the pulses arrive at the ADC, more than two non-zero data points may be sampled by ADC 218 from two consecutive pulses. For example, FIG. 5B illustrates three exemplary non-zero data points 522, 524, and 526 sampled from two sequentially returned laser pulses 520 and 525, according to embodiments of the disclosure. An intensity ratio may be calculated between two selected non-zero data points. For example, data point 522 and data point 524 in FIG. 5B may be selected to calculate the intensity ratio.

In some embodiments, a non-zero data point may have a relatively small value that is close to a noise level. Such a non-zero data point may not be selected for calculate the intensity ratio. For example, FIG. 5C illustrates two exemplary non-zero data points 532 and 534 sampled from two sequentially returned laser pulses 530 and 535 according to embodiments of the disclosure. Unlike in FIG. 5A, the second non-zero data point, 534, is sampled at time point t8 rather than t7. That is because the data point corresponding to sample time point t7 is close to zero. Therefore, the data point 534 generated at the next sample time point t8 is selected as a second non-zero data point to calculate the intensity ratio. As a result, the time difference between the two non-zero data points 532 and 534 becomes $(m+1) \cdot T_s$ rather than $m \cdot T_s$.

In some embodiments, the number of the laser pulses used for the range estimation may be equal or greater than twice a ratio of sampling period $T_s$ of ADC 218 and the pulse width (e.g., a width of the pulse above the noise level of electrical signal 213). For example, as shown in FIGS. 5A-5C, if the width of the emitted laser pulses is equal to sampling period $T_s$, at least two sequential laser pulses may be emitted by laser emitter 208 and received by ADC 218 to ensure that at least two non-zero data points can be sampled from the pulses to determine a valid intensity ratio.

Based on the intensity ratio calculated by ratio determination unit 342, pulse arrival time determination unit 344 in processor 304 may be configured to determine a time adjustment amount to the sample time of the first non-zero data point. For example, as shown in FIG. 5A, pulse 510 reaches its peak intensity value before sample time point t3. A time adjustment amount 513 may be determined and applied to sample time point t3 for determining the arrival time of pulse 510. Similarly, time adjustment amounts 523 and 533 may be determined and applied to sample time point t3 for determining an arrival time of pulses 520 and 530, respectively.

In some embodiments, a look-up table may be created to map intensity ratios to respective time adjustment amounts. In one example, as shown in FIG. 3, the look-up table (e.g., look-up table 360) may be pre-computed and stored in memory 306/storage 308 of controller 206 and retrieved by pulse arrival time determination unit 344. In another example, the look-up table may be stored and updated in a remote location and retrieved by controller 206 via communication interface 302 as needed.

In some embodiments, more than one look-up table may be pre-computed to determine the time adjustment amount. For example, FIGS. 6A-6B each illustrates an exemplary look-up table for determining the time adjustment amount to the sample time of the first non-zero data point, according to embodiments of the disclosure. Look-up table selection is dependent on the time difference between the sample times of the two data points selected for calculating the intensity ratio. For example, the look-up table shown in FIG. 6A may be selected to map intensity ratios of two data points with a sample time difference of $m \cdot T_s$. Accordingly, time adjustment amounts 513 and 523 in FIG. 5A and FIG. 5B may be determined using the look-up table shown in FIG. 6A based on the calculated intensity ratios. The look-up table shown in FIG. 6B may be selected to map intensity ratios of two data points with a sample time difference of $(m+1) \cdot T_s$. For example, time adjustment amount 533 shown in FIG. 5C may be determined using the look-up table shown in FIG. 6A based on the calculated intensity ratio between data points 532 and 534.

In some embodiments, pulse arrival time determination unit 344 in processor 304 may determine the time adjustment amount based on the intensity ratio between the two selected data points in real-time. For example, pulse arrival time determination unit 344 may first determine the sample time difference between the two non-zero data points. Based on the sample time difference (e.g., $m \cdot T_s$ or $(m+1) \cdot T_s$), pulse arrival time determination unit 344 may use the data of the emitted laser pulses (e.g., waveform information and the time delay between the pulses) to determine the time adjustment amount to the sample time of the first returned laser pulse. It is contemplated that pulse arrival time determination unit 344 in processor 304 may use any other suitable approach to dynamically determine the time adjustment amount based on the intensity ratio between the two selected non-zero data points.

In some embodiments, pulse arrival time determination unit 344 in processor 304 may further determine the arrival time of the first returned laser pulse using the sample time of the first selected data point and the determined time adjustment amount. For example, as shown in FIG. 5A, the arrival time of the peak of pulse 510 may be determined based on sample time point t3 and time adjustment amount 513. As shown in FIG. 5B, the arrival time of the peak of pulse 520 may be determined based on sample time point t3 and time adjustment amount 523. As shown in FIG. 5C, the arrival time of the peak of pulse 530 may be determined based on sample time point t3 and time adjustment amount 533.

Based on the arrival time of the pulse peak of the first returned laser pulse, range estimation unit 346 may determine the distance between the object and the LiDAR system. In some embodiments, the departure time of the first emitted laser pulse in laser beam 209 and the estimated arrival time of the pulse in returned laser beam 211 may be used to jointly determine the traveling time of the first emitted laser pulse. For example, memory 306 in FIG. 3 may store the departure time of the first emitted laser pulse in laser beam 209. Once the arrival time of the first returned laser pulse in laser beams 211 is determined by pulse arrival time determination unit 344, range estimation unit 346 may determine the traveling time (e.g., Time-of-Flight) of the first emitted laser pulse. Range estimation unit 346 may further determine the distance between the object and the LiDAR system based on the traveling time of the first emitted laser pulse and the speed of light. For example, the distance can be determined based on a formula of (speed of light×Time-of-Flight)/2.

Figure 7:
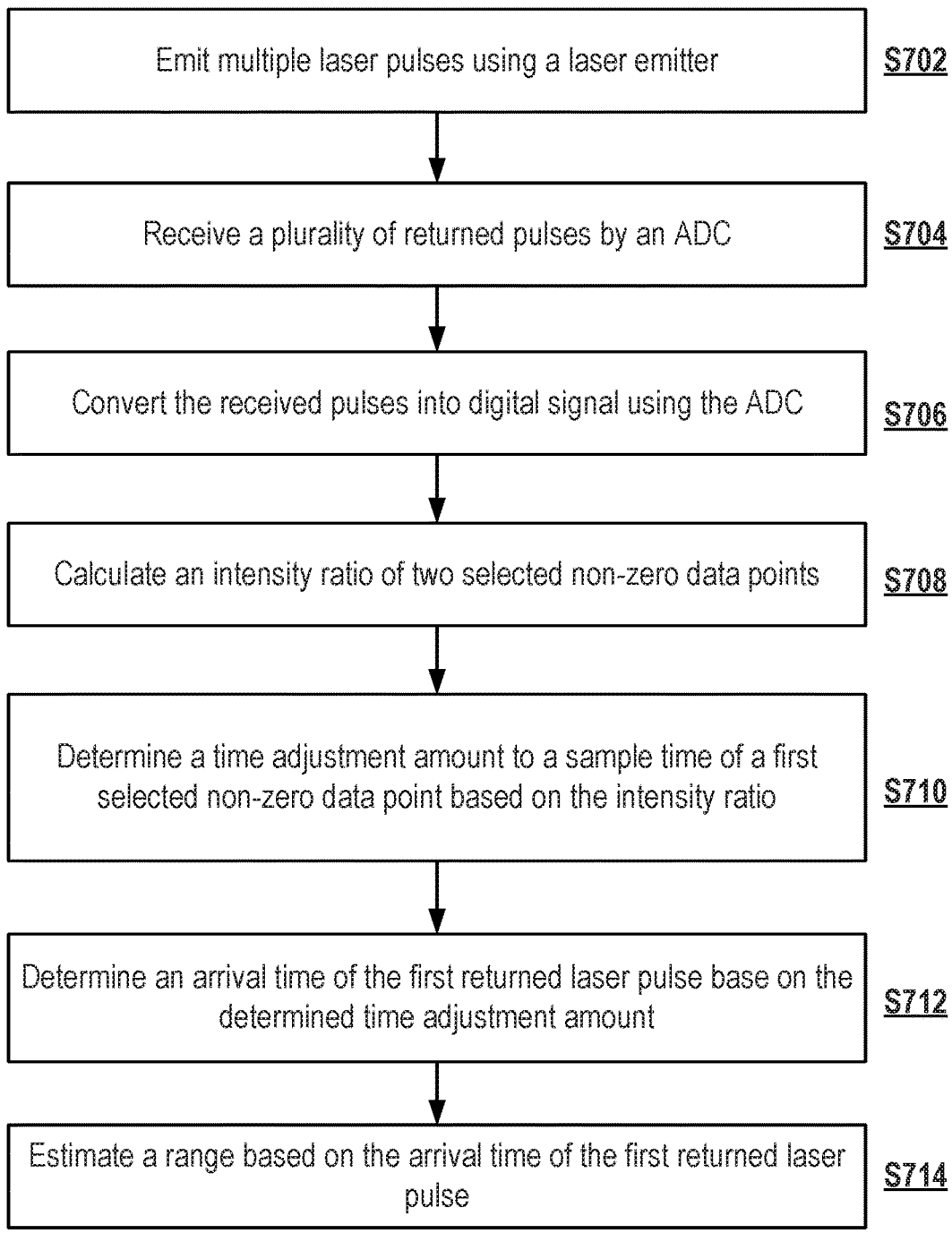
FIG. 7 is a flow chart of an exemplary method for estimating a range for a LiDAR system, according to embodiments of the disclosure.

FIG. 7 is a flow chart of an exemplary method 700 for estimating a range for a LiDAR system, according to embodiments of the disclosure. In some embodiments, method 700 may be performed by various components of LiDAR system 102, e.g., transmitter 202, receiver 204, and controller 206. In some embodiments, method 700 may include steps S702-S714. It is to be appreciated that some of the steps may be optional. Further, some of the steps may be performed simultaneously, or in a different order than shown in FIG. 7.

In step S702, controller 206 may control laser emitter 208 to emit multiple laser pulses towards object 212. Consistent with some embodiments, the multiple laser pulses may be a plurality of identical pulses emitted sequentially with a predetermined time delay apart. A departure time of the first emitted laser pulse may be stored in controller 206 for determining a traveling time of the first emitted laser pulse. In some embodiments, the time delay between each two emitted laser pulse may also be stored in controller 206 for determining an arrival time of a first returned laser pulse.

In step S704, ADC 218 in receiver 204 may receive electrical signal 213 reflecting the intensity information of returned laser beams 211. Electrical signal 213 may include a sequence of returned laser pulses. In step S706, electrical signal 213 may be sampled by ADC 218 to generate digital signal 215 including a plurality of non-zero data points and zero data points. Each non-zero data point may be proportional to an intensity value of the sampled returned laser pulse at the corresponding sample time point. Digital signal 215 may be transmitted to controller 206 for further processing.

In step S708, processor 304 may calculate an intensity ratio between two non-zero data points selected from the data points in digital signal 215. For example, the intensity ratio may be calculated between a first non-zero data point and a second non-zero data point. In some embodiments, the two selected non-zero data points may be sampled at a predetermined time difference apart. For example, the first non-zero data point (e.g., data point 512) may be sampled m times of sampling period $T_s$ earlier than the second non-zero data point (e.g., data point 514). But, if the data point generated m times of sampling period $T_s$ later than the first selected non-zero data point has a lower value than a noise level of electrical signal 213, a subsequent data point (e.g., data point 534) sampled (m+1) times of sampling period $T_s$ later than the first selected non-zero data point (e.g., data point 532) can be selected as the second data point to calculate the intensity ratio.

In step S710, processor 304 may determine a time adjustment amount to the sample time of the first selected non-zero data point based on the intensity ratio calculated in step S708. In some embodiments, the time adjustment amount may be determined based on a pre-computed look-up table that maps intensity ratios to respective time adjustment amounts. Different look-up tables may be pre-computed for different time differences between the two selected non-zero data points used for calculating the intensity ratio. For example, based on the time difference between the two selected data points (e.g., $m \cdot T_s$ or $(m+1) \cdot T_s$), processor 304 may retrieve the corresponding look-up table. Using the look-up table, processor 340 may look up the time adjustment amount mapped to the calculated intensity ratio.

In step S712, processor 304 may determine the time point (e.g., the arrival time of the first returned laser pulse) when the intensity value of the first returned laser pulse reaches a peak. Processor 304 may use the sample time of the first selected non-zero data point and the time adjustment amount determined in step S710 to determine the arrival time of the first returned laser pulse. For example, processor 304 may adjust the sample time of the first selected non-zero data point to determine the arrival time of the peak of the first returned laser pulse using the determined time adjustment amount.

In step S714, processor 304 may estimate the range between the object and the LiDAR system. Transmitter 202 may send the departure time of the first emitted laser pulse to controller 206. Accordingly, processor 304 may calculate the traveling time of the laser pulse based on the departure time and the arrival time of the first laser pulse. Processor 304 may further determine the distance between the object and the LiDAR system using the traveling time and the speed of light.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects. Emitters and driver circuits other than those disclosed above may be used. For example, the emitter may be any other light emitter suitable for emitting the optical signals used by the respective optical sensing systems and the driver circuit may be any driver suitable to drive the respective emitter.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A range estimation system for an optical sensing system, comprising:
an analog to digital converter (ADC) configured to convert a plurality of laser pulses of an identical waveform returned from an object to a digital signal, wherein the ADC has a predetermined sampling period; and
a processor, configured to:
calculate an intensity ratio between two data points selected from the digital signal, wherein the two data points are from two different laser pulses;
determine an arrival time of a first returned laser pulse based on the intensity ratio; and
estimate a range between the object and the optical sensing system based on the arrival time of the first returned laser pulse.

2. The range estimation system of claim 1, wherein the intensity ratio is a ratio of a first non-zero data point to a second non-zero data point in the digital signal.

3. The range estimation system of claim 2, wherein the first non-zero data point is sampled by the ADC from a first returned laser pulse and the second non-zero data point is sampled by the ADC from a second returned laser pulse.

4. The range estimation system of claim 2, wherein to determine the arrival time of the first returned laser pulse, the processor is further configured to:
determine a time adjustment amount according to a preset relationship to the intensity ratio; and
determine the arrival time of the first returned laser pulse by adjusting the sample time of the first non-zero data point using the determined time adjustment amount.

5. The range estimation system of claim 4, wherein the preset relationship between the intensity ratio and the time adjustment amount varies based on a time difference between the sample times of the first non-zero data point and the second non-zero data point, wherein to determine the time adjustment amount, the processor is further configured to:
select a look-up table recording the preset relationship based on the time difference between the sample times of the first non-zero data point and the second non-zero data point; and
determine the time adjustment amount using the selected look-up table based on the calculated intensity ratio.

6. The range estimation system of claim 5, wherein the time difference between the sample times of the first non-zero data point and the second non-zero data point is a summation of sampling periods of the ADC between the first non-zero data point and the second non-zero data point.

7. The range estimation system of claim 1, wherein a quantity of the returned laser pulses is equal to or greater than twice a ratio of the sampling period of the ADC to a width of each laser pulse.

8. The range estimation system of claim 3, wherein a time delay between the first returned laser pulse and the second returned laser pulse is a non-integer multiple of the sampling period of the ADC.

9. The range estimation system of claim 8, wherein the optical sensing system includes an emitter configured to emit the plurality of laser pulses towards the object each at the time delay.

10. A range estimation method for an optical sensing system, comprising:
converting, by an analog to digital converter (ADC) having a predetermined sampling period, a plurality of laser pulses of an identical waveform returned from an object to a digital signal;
calculating an intensity ratio, by a processor, between two data points selected from the digital signal, wherein the two data points are from two different laser pulses;
determining, by the processor, an arrival time of a first returned laser pulse, by the processor, based on the intensity ratio; and
estimating, by the processing, a range between the object and the optical sensing system, by the processor, based on the arrival time of the first returned laser pulse.

11. The range estimation method of claim 10, wherein the intensity ratio is a ratio of a first non-zero data point to a second non-zero data point in the digital signal.

12. The range estimation method of claim 11, wherein the first non-zero data point is sampled by the ADC from a first returned laser pulse and the second non-zero data point is sampled by the ADC from a second returned laser pulse.

13. The range estimation method of claim 11, wherein determining the arrival time of the first returned laser pulse further comprises:
determining a time adjustment amount according to a preset relationship to the intensity ratio; and
determining the arrival time of the first returned laser pulse by adjusting the sample time of the first non-zero data point using the determined time adjustment amount.

14. The range estimation method of claim 13, wherein the preset relationship between the intensity ratio and the time adjustment amount varies based on a time difference between the sample times of the first non-zero data point and the second non-zero data point, wherein determining the time adjustment amount further comprising:
selecting a look-up table recording the preset relationship based on the time difference between the sample times of the first non-zero data point and the second non-zero data point; and
determining the time adjustment amount using the selected look-up table based on the calculated intensity ratio.

15. The range estimation method of claim 14, wherein the time difference between the sample times of the first non-zero data point and the second non-zero data point is a summation of sampling periods of the ADC between the first non-zero data point and the second non-zero data point.

16. The range estimation method of claim 10, wherein a quantity of the returned laser pulses is equal to or greater than twice a ratio of the sampling period of the ADC to a width of each laser pulse.

17. The range estimation method of claim 12, wherein a time delay between the first returned laser pulse and the second returned laser pulse is a non-integer multiple of the sampling period of the ADC.

18. The range estimation method of claim 17, further comprising emitting the plurality of laser pulses towards the object each at the time delay.

19. An optical sensing system, comprising:
a transmitter configured to emit a plurality of laser pulses of an identical waveform towards an object; and
a range estimation system configured to estimate a range between the object and the optical sensing system, the range estimation system comprising:
an analog to digital converter (ADC) configured to convert a plurality of laser pulses of an identical waveform returned from an object to a digital signal, wherein the ADC has a predetermined sampling period; and
a processor, configured to:
calculate an intensity ratio between two data points selected from the digital signal, wherein the two data points are from two different laser pulse;
determine an arrival time of a first returned laser pulse based on the intensity ratio; and
estimate a range between the object and the optical sensing system based on the arrival time of the first returned laser pulse.

20. The optical sensing system of claim 19, wherein the intensity ratio is a ratio of a first non-zero data point to a second non-zero data point the digital signal, and wherein to determine the arrival time of the first returned laser pulse, the processor is further configured to:
determine a time adjustment amount according to a preset relationship to the intensity ratio; and
determine the arrival time of the first returned laser pulse by adjusting the sample time of the first non-zero data point using the determined time adjustment amount.

\* \* \* \* \*